United States Patent
Oren et al.

(10) Patent No.: US 7,756,037 B2
(45) Date of Patent: Jul. 13, 2010

(54) OVERSUBSCRIPTION OF GUARANTEED BANDWIDTH

(75) Inventors: Eyal Oren, Raanana (IL); Doron Shoham, Shoham (IL); Dalit Sagi, Tel Mond (IL)

(73) Assignee: Cisco Technology, Inc., San Jose, CA (US)

( * ) Notice: Subject to any disclaimer, the term of this patent is extended or adjusted under 35 U.S.C. 154(b) by 803 days.

(21) Appl. No.: 11/504,208

(22) Filed: Aug. 14, 2006

(65) Prior Publication Data

US 2008/0123689 A1    May 29, 2008

(51) Int. Cl.
*H04L 12/26* (2006.01)
(52) U.S. Cl. .................. 370/235; 370/230; 370/395.41; 370/395.42; 370/468
(58) Field of Classification Search .................. None
See application file for complete search history.

(56) References Cited

U.S. PATENT DOCUMENTS

| | | | |
|---|---|---|---|
| 5,339,332 A | 8/1994 | Kammerl | |
| 5,625,622 A | 4/1997 | Johri | |
| 6,075,772 A * | 6/2000 | Brown et al. | 370/235 |
| 6,118,791 A | 9/2000 | Fichou et al. | |
| 6,167,027 A | 12/2000 | Aubert et al. | |
| 6,247,061 B1 | 6/2001 | Douceur et al. | |
| 6,286,052 B1 | 9/2001 | McCloghrie et al. | |
| 6,349,088 B1 | 2/2002 | Ginzboorg et al. | |
| 6,831,893 B1 | 12/2004 | Ben-Nun et al. | |
| 6,956,818 B1 * | 10/2005 | Thodiyil | 370/230 |
| 7,042,886 B2 | 5/2006 | Ben Nun | |
| 2003/0204584 A1 | 10/2003 | Zeira et al. | |
| 2004/0062259 A1 * | 4/2004 | Jeffries et al. | 370/412 |
| 2005/0152374 A1 * | 7/2005 | Cohen et al. | 370/395.4 |

OTHER PUBLICATIONS

Shreedhar and Varghese, "Efficient fair queuing using deficit round robin", Proceedings of the Conference on Applications, Technologies, Architectures, and Protocols for Computer Communication, Aug. 28-Sep. 1, 1995, Cambridge, Massachusetts, pp. 231-242.
http://www.kazaa.com.
http://www.gnutella.com.

* cited by examiner

*Primary Examiner*—Daniel J Ryman
*Assistant Examiner*—Tito Pham
(74) *Attorney, Agent, or Firm*—Abelman, Frayne & Schwab

(57) ABSTRACT

A method for communication includes allocating target bandwidths to two or more packet sources and defining one or more of the packet sources as preferred sources. Quantum values defining maximum amounts of data to be sent during a single scheduling round are defined for the respective packet sources. Repetitive scheduling rounds are performed in order to determine a schedule for processing pending data packets produced by the packet sources. In each scheduling round, all pending packets that are produced by the preferred sources and are within the target bandwidths allocated to the preferred sources are scheduled. Pending packets produced by packet sources other than the preferred sources are scheduled in accordance with the quantum values, within the target bandwidths allocated to the packet sources other than the preferred sources. The pending packets are processed responsively to the schedule. The target bandwidths may comprise, for example, guaranteed bandwidths or excess bandwidths.

14 Claims, 2 Drawing Sheets

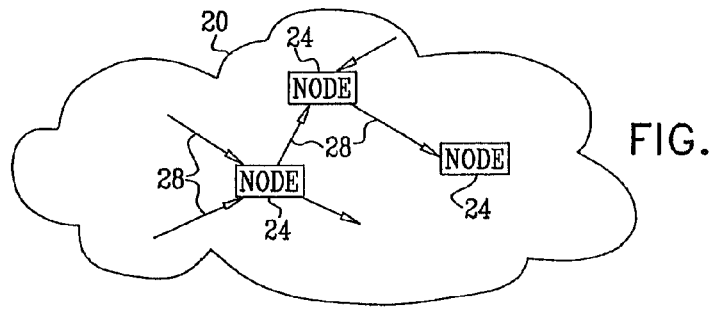
FIG. 1
FIG. 2
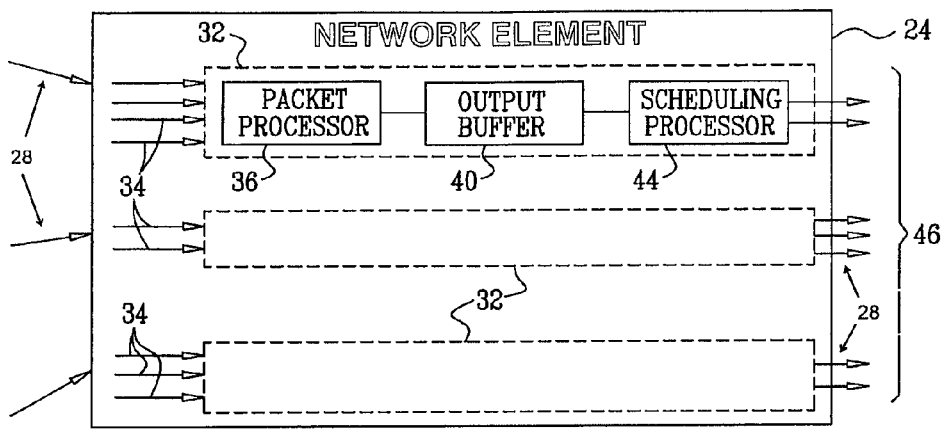
FIG. 3
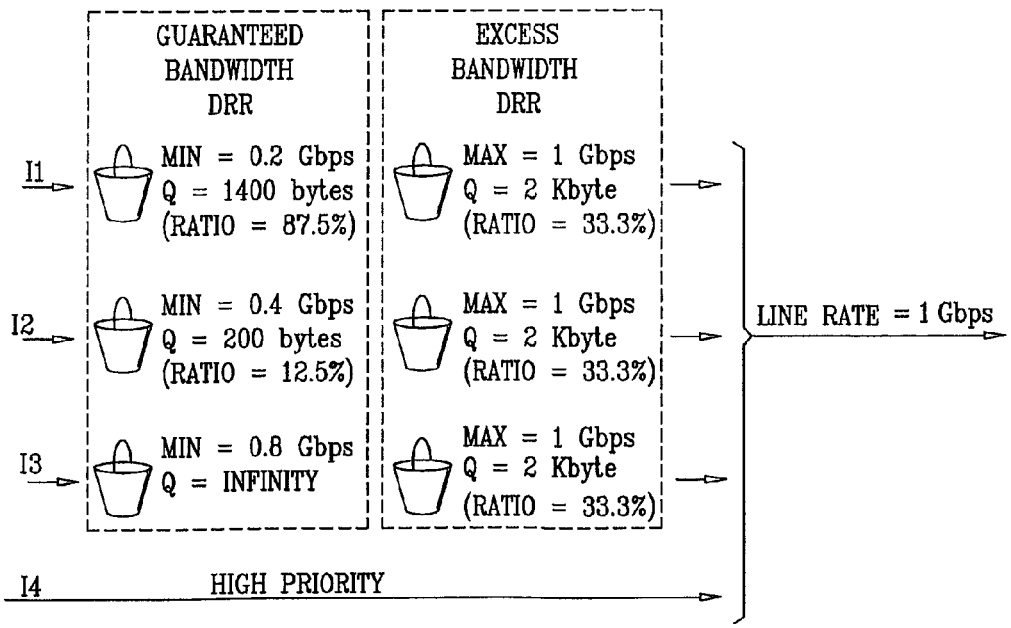

OVERSUBSCRIPTION OF GUARANTEED BANDWIDTH

FIELD OF THE INVENTION

The present invention relates generally to communication networks, and particularly to methods and systems for scheduling data packets in network elements.

BACKGROUND OF THE INVENTION

In many communication applications, a network element queues and processes data packets originating from different sources. Often, multiple packet sources compete with one another for access to a common resource associated with the network element, such as for bandwidth on a common output port. Several methods are known in the art for scheduling packets that compete for a common resource. For example, some scheduling methods use a Round Robin (RR) process, in which the packet sources are served in a cyclic order. In each RR round, each of the packet sources is served if it is eligible. When served, each source is permitted to send one packet.

Other methods use Deficit Round Robin (DRR) scheduling, which defines a traffic ratio among the different packet sources. By defining the traffic ratio, also referred to as a quantum value, some sources are allowed to consume more resources than others. DRR is described, for example, by Shreedhar and Varghese in "Efficient Fair Queuing Using Deficit Round Robin," Proceedings of the Conference on Applications, Technologies, Architectures, and Protocols for Computer Communication, Aug. 28-Sep. 1, 1995, Cambridge, Mass., pages 231-242, which is incorporated herein by reference.

In some applications, packet sources are queued and scheduled in accordance with a scheduling hierarchy. For example, U.S. Patent Application Publication 2005/0152374 A1, whose disclosure is incorporated herein by reference, describes methods for scheduling of items in a hierarchy of schedules. The methods include propagation of minimum guaranteed scheduling rates among scheduling layers in a hierarchical schedule.

The present invention will be more fully understood from the following detailed description of the embodiments thereof, taken together with the drawings in which:

BRIEF DESCRIPTION OF THE DRAWINGS

FIG. 1 is a block diagram that schematically illustrates a communication network, in accordance with an embodiment of the present invention;

FIG. 2 is a block diagram that schematically illustrates details of a network element, in accordance with an embodiment of the present invention;

FIG. 3 is a schematic diagram showing a packet scheduling process, in accordance with an embodiment of the present invention;

DETAILED DESCRIPTION OF EMBODIMENTS

Overview

Figure 4:
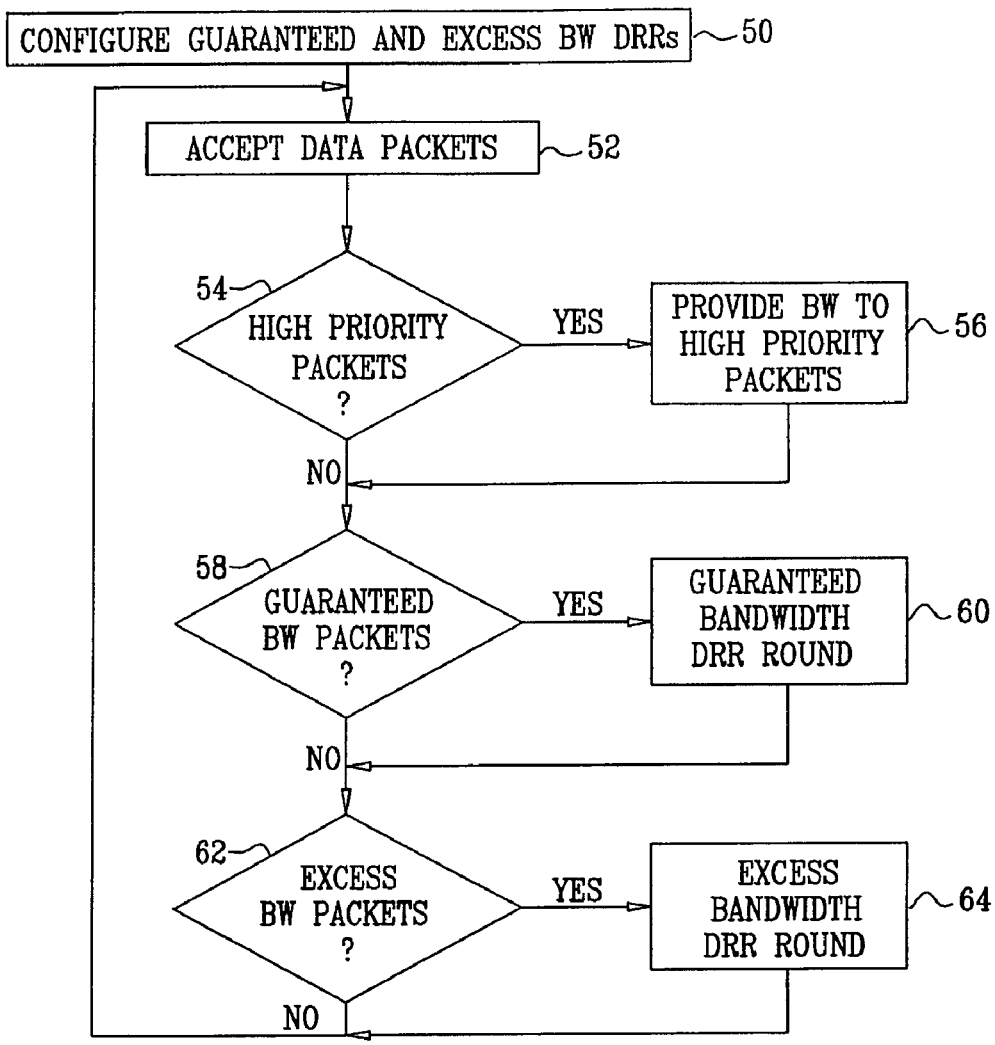
FIG. 4 is a flow chart that schematically illustrates a method for scheduling data packets, in accordance with an embodiment of the present invention.

In many communication services and networks, packet sources are guaranteed certain respective amounts of bandwidth, such as by service agreements between clients and service providers. Network elements are expected to simultaneously allocate the respective guaranteed bandwidths to data packets originating from these packet sources.

Practically, however, it is extremely unlikely that all packet sources will actually consume their guaranteed bandwidths simultaneously. Thus, it is often possible to oversubscribe guaranteed bandwidth among multiple packet sources. In other words, it is often possible for a network element to provide guaranteed bandwidth to multiple packet sources, even when the sum of guaranteed bandwidths exceeds the instantaneously-allocable bandwidth. Bandwidth oversubscription enables a more efficient use of network and network element resources.

Embodiments of the present invention provide methods and systems for queuing and scheduling data packets using oversubscribed guaranteed bandwidth. The methods and systems described herein define relative traffic ratios among the packet sources. One or more of the packet sources may be defined as preferred sources. If the sum of requested bandwidths exceeds the instantaneously-allocable bandwidth at any given time (i.e., if the network element is unable to provide the guaranteed bandwidth as expected), available bandwidth is first allocated to the preferred sources. Remaining bandwidth is then divided among the other packet sources in accordance with the traffic ratios.

In some embodiments, when the instantaneously-allocable bandwidth is exceeded, the available bandwidth is allocated to the packet sources using a Deficit Round Robin (DRR) process in which DRR quantum values represent the relative traffic ratios. Within the DRR process, the quantum values of the preferred sources are set to infinity, so that their pending data packets are scheduled regardless of their size. In some embodiments, a separate DRR process is carried out for allocating the remaining excess bandwidth. Additionally or alternatively, one or more packet sources may be defined as high-priority sources whose packets bypass the DRR processes.

Multiple instances of the scheduling methods described herein can be applied in a hierarchical manner, for scheduling hierarchical packet sources, as will be demonstrated below.

System Description

FIG. 1 is a block diagram that schematically illustrates a communication network 20, in accordance with an embodiment of the present invention. Network 20 may comprise a wide area network (WAN) such as the Internet, a local area network (LAN), or any other suitable network. Typically, network 20 comprises an Internet Protocol (IP) network. Network 20 comprises network elements 24, such as routers and other switches, which exchange data packets with one another over network links 28.

Typically, each network element accepts data packets from one or more packet sources. Packet sources may comprise, for example, individual applications, application types (e.g., time-constrained voice applications or multimedia applications), groups of applications such as virtual LANs (VLANs), input ports of the network element, or any other suitable packet classification. In some cases, the packet sources are defined hierarchically. For example, a number of individual applications may belong to a certain VLAN group, and/or be provided over a particular input port.

Each network element accepts packets from a number of packet sources and processes each of the packet sources in accordance with a particular class-of-service (COS). For example, a certain packet source may be defined as having a certain guaranteed bandwidth, also referred to as minimum bandwidth. The network element is expected to unconditionally provide the specified guaranteed bandwidth to packets originating from this type of packet source. As another example, a certain packet source may be defined as having a certain excess bandwidth, also referred to as maximum bandwidth or best effort bandwidth. The network element provides excess bandwidth to excess bandwidth packets only if such bandwidth is currently available, on a best effort basis. Otherwise, the packets are queued until bandwidth becomes available.

Packet sources are often specified as having both a minimum guaranteed bandwidth and a best effort excess bandwidth. Typically, guaranteed bandwidth is priced at a higher price than excess bandwidth. Further additionally or alternatively, one or more packet sources may be defined as high priority sources. Packets originating from a high priority source are given first priority in assigning bandwidth. Network elements 24 process the accepted packets, for example in order to forward each packet to its appropriate destination in network 20. The network elements serve each packet source in accordance with its specified COS, using methods that are described in detail herein below.

FIG. 2 is a block diagram that schematically illustrates details of network element 24, in accordance with an embodiment of the present invention. Network element 24 accepts data packets from other elements of network 20 and processes the packets using line cards 32. Each line card may accept data packets from multiple inputs 34. Inputs 34 often comprise outputs of other line cards in network element 24. The accepted packets are processed by a packet processor 36, which also functions as an interface to the packet sources. The packets produced by the packet processor are buffered in an output buffer 40. Buffer 40 typically comprises multiple output queues, one queue for each packet source. A scheduling processor 44 determines the order in which buffered (i.e., pending) packets are to be served. Scheduling processor 44 forwards the data packets, in accordance with the determined scheduling order, to their proper destinations over one or more output ports 46. Typically, network element 24 comprises multiple inputs 34, line cards 32 and output ports 46. In an alternative embodiment, packets processed by a particular line card 32 may be buffered in an input buffer (not shown) upon entering the line card, instead of using an output buffer.

Line card 32 may be implemented using hardware, software or a combination of hardware and software elements. For example, the line card may comprise one or more field-programmable gate arrays (FPGAs), application-specific integrated circuits (ASICs), and/or CPUs. In particular, scheduling processor 44 may be implemented using hardware, software or a combination of the two. The software may be downloaded to processor 44 in electronic form, over a network, for example, or it may alternatively be supplied to the processor as a computer software product on tangible computer-readable medium, such as CD-ROM.

The network element configuration of FIG. 2 is an exemplary configuration, which was chosen purely for the sake of conceptual clarity. Other suitable configurations of network element 24 will be apparent to those skilled in the art. For example, packets can be buffered in the network element in an input buffer, an output buffer, or a combination of input and output buffers.

Scheduling of Oversubscribed Guaranteed Bandwidth

DRR, as is known in the art, is often used for sharing a common resource at different ratios among several sources (i.e., some sources are allowed to consume more of the resource than others). The ratios are typically defined in terms of quantum values assigned to the different sources. The quantum value defines the amount of traffic, typically expressed in bytes, which may be sent by the respective source in each DRR round. The source may send multiple packets in each round, up to the specified quantum. As a result, the available resource is divided among the sources proportionally to their quantum values. A more detailed description of DRR is given in the references cited above.

Scheduling processor 44 gives the highest scheduling priority to high-priority packet sources. With the exception of high-priority sources, packet processor 36 tracks the rate of traffic originating from each packet source. Based on this measurement, scheduling processor 44 determines whether the source has already consumed its guaranteed bandwidth quota or not. If the source has not yet consumed its guaranteed bandwidth, pending packets originating from this source are referred to as guaranteed bandwidth packets, which are given high priority in the scheduling process. Otherwise, the packets are referred to as excess bandwidth packets and are given lower scheduling priority.

In some embodiments, packet processor 36 may use a token bucket process, as is known in the art, for tracking the traffic rates of the packet sources and classifying packets as guaranteed or excess bandwidth packets. In a typical token bucket process, each source has a virtual token bucket, which is periodically filled with tokens at a rate proportional to the guaranteed bandwidth of the source. Whenever a packet is sent by the source, the number of tokens in the bucket is reduced in proportion to the packet size. Typically, a maximum number of tokens is defined for each bucket.

As long as the bucket contains tokens, pending packets from this source are identified as guaranteed bandwidth packets. An empty token bucket indicates that the source has consumed its guaranteed bandwidth quota. Subsequent pending packets are identified as excess bandwidth packets, until the bucket is filled again. In some embodiments, processor 36 may also carry out token bucket processes for identifying whether the source has consumed its excess bandwidth quota. In alternative embodiments, processor 36 may use any other suitable method for classifying packets as guaranteed or excess bandwidth packets.

Based on the classification of pending packets to guaranteed and excess bandwidth packets, scheduling processor 44 carries out two DRR processes, referred to as guaranteed bandwidth and excess bandwidth DRRs. The processor first performs a DRR round among the guaranteed bandwidth packets that are currently pending, using the quantum values of the guaranteed bandwidth DRR. In DRR terms, a packet source that has packets to transmit and whose guaranteed bandwidth bucket is not empty is eligible to participate in the guaranteed bandwidth DRR round.

It should be noted that the association of a particular packet source with a certain class-of-service and a particular DRR typically varies over time. A particular packet source may participate in the guaranteed bandwidth DRR at certain times (when it has not currently consumed its guaranteed bandwidth) and participate in the excess bandwidth DRR at other times.

If the instantaneous demand for guaranteed bandwidth exceeds the currently-allocable bandwidth, the available bandwidth is divided among the guaranteed bandwidth packets using the quantum values of the guaranteed bandwidth DRR. The packet sources in the guaranteed bandwidth DRR are served sequentially. In each round, each source is allowed to send one or more pending packets, in accordance with its predefined quantum value.

In some embodiments, a particular packet source participating in the guaranteed bandwidth DRR is given a preference, or higher priority, over other packet sources in this DRR. When a preferred packet source is served by the guaranteed bandwidth DRR, its currently pending data packets are scheduled, regardless of their individual or aggregate size. Such a preference may be implemented by setting the quantum value of the preferred packet source to infinity (or, equivalently, to any other sufficiently large value, so as to cause all pending packets of the preferred packet source to be served). Note that a preferred packet source is still subject to the guaranteed bandwidth definition. In other words, pending packets of a preferred source will be scheduled only as long as they do not exceed the guaranteed bandwidth defined for that source.

Processor 44 now allocates the remaining bandwidth, if any remains, to excess bandwidth packets. The processor performs a DRR round among the excess bandwidth packets using the quantum values of the excess bandwidth DRR.

In summary, scheduling processor 44 schedules data packets in accordance with four different classes-of-service. High-priority packets bypass the entire dual-DRR process and are given the highest scheduling priority. The next priority is given to preferred packet sources among the sources eligible for participating in the guaranteed bandwidth DRR. Third priority is given to the other packet sources in the guaranteed bandwidth DRR. The fourth and lowest priority is given to packet sources participating in the excess bandwidth DRR.

In alternative embodiments, processor 44 may use different arrangements of classes-of-service and priority levels, in which a particular packet source is given a preference over other sources within a particular DRR by scheduling all its pending packets regardless of size. One or more such preferred sources may be defined.

FIG. 3 is a schematic diagram showing an exemplary packet scheduling process carried out by scheduling processor 44, in accordance with an embodiment of the present invention. The figure shows four packet sources denoted I1 . . . I4, which compete for bandwidth of an output port having a line rate of 1 Gbps. Packet source I4 comprises a high-priority source, whose packets bypass the DRR processes and are given the highest priority.

Each of packet sources I1 . . . I3 has specified guaranteed (minimum) and excess (best effort) bandwidths. Packet sources I1, I2 and I3 have minimum bandwidths of 0.2, 0.4 and 0.8 Gbps, respectively. Unlike some known systems, the sum of these minimum bandwidths is 1.4 Gbps, which exceeds the 1 Gbps line rate of the output port. In the rare event that sources I1 . . . I3 jointly consume more than 1 Gbps at a given point in time, scheduling processor 40 uses the guaranteed bandwidth DRR to establish fair queuing among the three packet sources.

In the present example, the quantum values of sources I1 . . . I3 in the guaranteed bandwidth DRR are set to 1400 bytes, 200 bytes and infinity, respectively. Thus, source I3 is given a preference over sources I1 and I2. When source I3 is served by the guaranteed bandwidth DRR, all its pending packets are scheduled (within the limits of its guaranteed bandwidth), regardless of their size. Among sources I1 and I2, the predetermined quantum values maintain that whenever the bandwidth demand exceeds the currently-allocable bandwidth, 87.5% of the available bandwidth is provided to source I1 and 12.5% is provided to I2.

Each of packet sources I1 . . . I3 has an excess bandwidth of 1 Gbps. Processor 44 uses the excess bandwidth DRR to maintain fairness among packet sources I1 . . . I3 when allocating excess bandwidth over the 1 Gbps output port. In the present example, each of these packet sources has a quantum value of 2 Kbytes in the excess bandwidth DRR. Since the quantum values of the sources I1 . . . I3 are equal to one another, excess bandwidth is allocated evenly among them.

FIG. 4 is a flow chart that schematically illustrates a method for scheduling data packets, in accordance with an embodiment of the present invention. The method begins with a user, such as a network administrator or designer, configuring the guaranteed and excess DRRs, at a DRR configuration step 50.

The user defines the guaranteed and excess bandwidth of each packet source. Additionally, the user defines the traffic volume ratios for dividing the currently-allocable bandwidth among guaranteed bandwidth packets, if the instantaneous demand for guaranteed bandwidth exceeds the currently-allocable bandwidth. The ratios are defined in terms of quantum values of the guaranteed bandwidth DRR. The user may set one or more quantum values to infinity, in order to give a preference to the corresponding packet sources in the DRR process. The user also defines quantum values of the excess bandwidth DRR, which define the ratios using which any remaining bandwidth is divided among excess bandwidth packets. One or more of the quantum values of the excess bandwidth DRR can also be set to infinity, so as to give certain packet sources a preference in the allocation of excess bandwidth. The user may also define one or more packet sources as high-priority sources.

Packet processor 36 accepts data packets from the different packet sources, at a packet acceptance step 52. Processor 36 classifies packets originating from high-priority sources as high priority packets. The processor classifies the other pending packets to guaranteed bandwidth and excess bandwidth packets, for example using a token bucket process.

Scheduling processor 44 checks whether high priority packets are pending, at a high priority checking step 54. If such packets are pending, processor 44 schedules the high priority packets first, at a high priority scheduling step 56, bypassing the dual DRR process altogether.

Processor 44 checks whether guaranteed bandwidth packets are pending, at a guaranteed packet checking step 58. If guaranteed bandwidth packets are pending, processor 44 carries out a guaranteed bandwidth DRR round among all eligible guaranteed bandwidth packets, at a guaranteed DRR step 60. Thus, bandwidth is provided to the guaranteed bandwidth packets in accordance with the quantum values of the guaranteed bandwidth DRR. If a particular quantum value is set to infinity, processor 44 schedules all pending packets of the corresponding packet source, regardless of their size, while not exceeding the guaranteed bandwidth defined for the source.

Assuming some free bandwidth is available after scheduling the high priority and guaranteed bandwidth packets, processor 44 checks whether excess bandwidth packets are pending, at an excess packet checking step 62. If excess bandwidth packets are pending, processor 44 carries out an excess bandwidth DRR round among the eligible excess bandwidth packets, at an excess DRR step 64. The method then loops back to step 52 above to continue accepting and processing additional data packets.

Scheduling of Hierarchical Packet Sources

As noted above, packet sources may sometimes be defined hierarchically. For example, a number of individual applications may belong to a certain VLAN group. A number of groups, possibly along with other individual applications, may be provided over a particular input port.

The scheduling process described in FIGS. 3 and 4 above can be repeated at different stages of the source hierarchy. For example, scheduling processor 44 may schedule a number of individual applications, regarded as packet sources, onto a particular input port using the methods described above. This input port can be regarded as a packet source, which is scheduled together with other packet sources onto an output port of the network element. Generally, each scheduling stage in the hierarchy comprises two DRR processes, which are configured with guaranteed and excess bandwidths and the associated quantum values.

Figure 5:
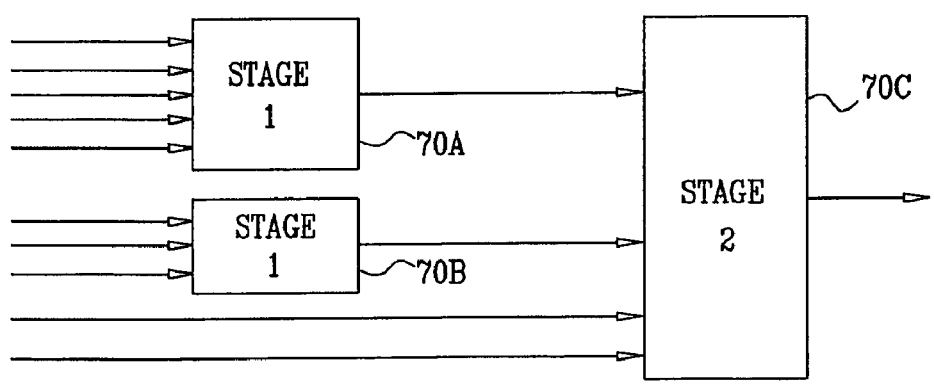
FIG. 5 is a schematic diagram showing a hierarchical packet scheduling process, in accordance with an embodiment of the present invention.

FIG. 5 is a schematic diagram showing an exemplary hierarchical packet scheduling process, carried out by processor 44, in accordance with an embodiment of the present invention. The process of FIG. 5 schedules a total of ten packet sources onto a single output port, in two stages. Five packet sources are scheduled by a scheduler 70A. Three other sources are scheduled by a scheduler 70B. The outputs of schedulers 70A and 70B are scheduled with the two remaining packet sources by a scheduler 70C.

In general, each of schedulers 70A, 70B and 70C carries out a process similar to the process described in FIGS. 3 and 4 above. Each packet source (including the outputs of schedulers 70A and 70B, which are considered to be packet sources by scheduler 70C) is configured with guaranteed and excess bandwidth values and associated quantum values.

Although the embodiments described herein mainly refer to scheduling of packets, the principles of the present invention can also be used for scheduling packet-related information, such as packet headers or other attributes. Additionally or alternatively to bandwidth allocation, the methods and systems described herein can be used to allocate any other network or network element resource related to packet processing, such as memory space and CPU usage. The principles of the present invention can be used in any suitable application in which multiple sources having guaranteed resource allocation levels compete for a common resource. For example, handling interrupts in a CPU may be implemented using such methods.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for scheduling sending of data packets in a network element, the data packets originating in at least two packet sources, the method comprising:

selecting at least one preferred packet source from among the at least two packet sources;

allocating respective target bandwidths and specifying respective quantum values representing relative traffic ratios among the at least two packet sources for at least two deficit round robin (DRR) scheduling processes including a guaranteed bandwidth DRR scheduling process and an excess bandwidth DRR scheduling process;

receiving data packets from the at least two packet sources;

performing, by a scheduling processor, repetitive scheduling rounds of the at least two DRR scheduling processes to determine a schedule for processing data packets from the at least two packet sources;

wherein data packets are scheduled according to the following classes of service:

high-priority data packets;

data packets from the at least one preferred packet source;

guaranteed bandwidth data packets from the at least one preferred packet source; and excess bandwidth data packets; and wherein each scheduling round comprises:

determining a remaining available bandwidth;

scheduling the high-priority data packets with a highest scheduling priority to bypass the DRR scheduling processes;

scheduling the data packets from the at least one preferred packet source which are within the respective target bandwidths for the sources thereof in the guaranteed bandwidth DRR scheduling process with a second priority;

scheduling the guaranteed bandwidth data packets not from the at least one preferred packet source, with a third priority within the guaranteed bandwidth DRR scheduling process, according to the respective quantum values for the sources thereof and the remaining available bandwidth; and scheduling the excess bandwidth data packets with a fourth priority within the excess bandwidth DRR scheduling process, according to the respective quantum values for the sources thereof and the remaining available bandwidth; and processing, by the scheduling processor, the data packets responsively to the schedule.

2. The method according to claim 1, wherein scheduling the data packets from the at least one preferred packet source comprises setting the quantum value of the at least one preferred source to a large value, so as to cause packets of the at least one preferred packet source to be sent.

3. The method according to claim 1, wherein performing the repetitive scheduling rounds comprises selecting out of the two or more packet sources a subset of eligible sources that have not consumed their respective allocated target bandwidths, and performing the repetitive scheduling rounds within the subset of eligible sources.

4. The method according to claim 3, wherein selecting the subset of eligible sources comprises measuring respective amounts of bandwidth consumed by the at least two packet sources using a token bucket process.

5. The method according to claim 1, wherein the packet sources are arranged in at least two stages of hierarchy, and wherein performing the scheduling rounds comprises performing the scheduling rounds at each of the at least two stages of hierarchy.

6. The method according to claim 1, wherein a sum of the target bandwidths is greater than a currently-allocable bandwidth, and wherein performing the repetitive scheduling rounds comprises dividing the currently-allocable bandwidth among the at least two packet sources in proportion to the respective quantum values, while giving a preference to the at least one preferred packet source.

7. Apparatus for scheduling sending of data packets in a network element, the apparatus comprising:
- an interface, which is arranged to accept data packets from at least two packet sources; and
- a processor which is arranged to:
  - select at least one preferred packet source from among the at least two packet sources;
  - allocate respective target bandwidths and respective quantum values representing relative traffic ratios among the at least two packet sources for at least two deficit round robin (DRR) scheduling processes including a guaranteed bandwidth DRR scheduling process and an excess bandwidth DRR scheduling process;
  - receive data packets from the at least two packet sources;
  - perform repetitive scheduling rounds of the at least two DRR scheduling process to determine a schedule for processing data packets from the at least two packet sources;
    - wherein data packets are scheduled according to the following classes of service;
      - high-priority data packets;
      - data packets from the at least one preferred packet source;
      - guaranteed bandwidth data packets not from the at least one preferred packet source; and
      - excess bandwidth data packets; and
    - within each scheduling round to:
      - determine a remaining available bandwidth;
      - schedule the high-priority data packets with a highest scheduling priority to bypass the DRR scheduling processes;
      - schedule the data packets from the at least one preferred packet source which are within the respective target bandwidths for the sources thereof in the guaranteed bandwidth DRR scheduling process with a second priority;
      - schedule the guaranteed bandwidth data packets not from the at least one preferred packet source, with a third priority within the guaranteed bandwidth DRR scheduling process, according to the respective quantum values for the sources thereof and the remaining available bandwidth;
      - schedule the excess bandwidth data packets with a fourth priority within the excess bandwidth DRR scheduling process, according to the respective quantum values for the sources thereof and the remaining available bandwidth; and to
  - process the data packets responsively to the schedule.

8. The apparatus according to claim 7, wherein the processor is arranged to set the quantum values of the at least one preferred packet source to a large value, so as to cause all the packets of the at least one preferred packet source to be sent.

9. The apparatus according to claim 7, wherein the processor is arranged to select out of the at least two packet sources a subset of eligible sources that have not consumed their respective allocated bandwidths, and to perform the repetitive scheduling rounds within the subset of eligible sources.

10. The apparatus according to claim 9, wherein the processor is arranged to measure respective amounts of bandwidth consumed by the at least two packet sources using a token bucket process so as to select the subset of eligible sources.

11. The apparatus according to claim 7, wherein the packet sources are arranged in at least two stages of hierarchy, and wherein the processor is arranged to perform the repetitive scheduling rounds at each of the at least two stages of hierarchy.

12. The apparatus according to claim 7, wherein a sum of the respective target bandwidths is greater than a currently-allocable bandwidth, and wherein the processor is arranged to divide the currently-allocable bandwidth among the at least two packet sources in proportion to the respective quantum values, while giving a preference to the at least one preferred packet source.

13. Apparatus for scheduling sending of data packet in a network element, the apparatus comprising:
- means for selecting at least one preferred packet source from among the at least two packet sources;
- means for allocating respective target bandwidths and respective quantum values representing relative traffic ratios among the at least two packet sources for at least two deficit round robin (DRR) scheduling processes including a guaranteed bandwidth DRR scheduling process and an excess bandwidth DRR scheduling process;
- means for receiving data packets form the at least two packet sources;
- means for performing repetitive scheduling rounds of the at least two DRR scheduling processes to determine a scheduling for processing data packets from the at least two packet sources;
  - wherein data packets are scheduled according to the following classes of service:
    - high-priority data packets;
    - data packets from the at least one preferred packet source;
    - guaranteed bandwidth data packets not from the at least one preferred packet source; and
    - excess bandwidth data packets; and
- means for determining within each scheduling round a remaining available bandwidth;
- means for scheduling within each scheduling round:
  - the high-priority data packets, with a highest scheduling priority to bypass the DRR scheduling processes;
  - the data packets from the at least one preferred packet source which are within the respective target bandwidths for the sources thereof in the guaranteed bandwidth DRR scheduling process with a second priority;
  - the guaranteed bandwidth data packets not from the at least one preferred packet source, with a third priority within the guaranteed bandwidth DRR scheduling process, according to the respective quantum values for the sources thereof and the remaining available bandwidth; and
  - the excess bandwidth data packets with a fourth priority within the excess bandwidth DRR scheduling process, according to the respective quantum values for the sources thereof and the remaining available bandwidth; and
- means for processing the data packets responsively to the schedule.

14. A computer product for scheduling sending of data packets in a network element, the product comprising a tangible computer-readable medium in which program instructions are stored, which instructions, when executed by a computer, cause the computer to:
- select at least one preferred packet source from among the at least two packet sources;
- allocate respective target bandwidths and respective quantum values representing relative traffic ratios among the at least two packet sources for at least two deficit round robin (DRR) scheduling processes including a guaranteed bandwidth DRR scheduling process and an excess bandwidth DRR scheduling process;

receive data packets from the at least packet sources;

perform repetitive scheduling rounds of the at least two DRR scheduling process to determine a schedule for processing data packets from the at least two packet sources;

wherein data packets are scheduled according to the following classes of service:

high-priority data packets;

data packets from the at least one preferred packet source;

guaranteed bandwidth data packets not from the at least one preferred packet source; and excess bandwidth data packets; and within each scheduling round to:

determine a remaining available bandwidth;

schedule the high-priority data packets with a highest scheduling priority to bypass the DRR scheduling process;

schedule the data packets from the at least one preferred packet source which are within the respective target bandwidths for the sources thereof in the guaranteed bandwidth DRR scheduling process with a second priority;

schedule the guaranteed bandwidth data packets not from the at least one preferred packet source, with a third priority within the guaranteed bandwidth DRR scheduling process, according to the respective quantum values for the sources thereof and the remaining available bandwidth;

schedule the excess bandwidth data packets with a fourth priority within the excess bandwidth DRR scheduling process, according to the respective quantum values for the sources thereof and the remaining available bandwidth; and to process the data packets responsively to the schedule.

* * * * *